United States Patent [19]

Suzuki et al.

[11] Patent Number: 5,064,938

[45] Date of Patent: Nov. 12, 1991

[54] CONTINUOUS PRODUCTION PROCESS OF PARTICULATE POLYMER AND CONTROL METHOD OF THE PARTICLE SIZE OF SAID POLYMER

[75] Inventors: Fumio Suzuki; Hideaki Habara; Yutaro Fukuda; Haruki Sato; Hiromasa Inada, all of Ohtake, Japan

[73] Assignee: Mitsubishi Rayon Co., Ltd., Tokyo, Japan

[21] Appl. No.: 617,265

[22] Filed: Nov. 23, 1990

Related U.S. Application Data

[63] Continuation of Ser. No. 345,548, Apr. 14, 1989, abandoned.

[30] Foreign Application Priority Data

Sep. 25, 1987 [JP] Japan .................................. 62-241798
Sep. 25, 1987 [JP] Japan .................. PCT JP88/00974

[51] Int. Cl.$^5$ ................................................ C08F 6/22
[52] U.S. Cl. .................................... 528/491; 528/497; 528/498; 523/335; 523/336; 524/157; 524/503
[58] Field of Search ................. 523/335, 336; 524/157, 524/503; 528/498, 497, 491

[56] References Cited

U.S. PATENT DOCUMENTS

| | | | |
|---|---|---|---|
| 3,682,857 | 8/1972 | Harris et al. | 525/83 |
| 4,401,806 | 8/1983 | Hagiwara et al. | 523/335 |
| 4,767,803 | 8/1988 | Yasui et al. | 523/335 |

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

The invention discloses a process for the production of a particulate polymer which contains few fine particles and has a narrow particle size distribution and a controlled bulk specific gravity. Characteristic features of the process of this invention reside in that a polymer latex obtained by emulsion polymerization is successively processed through the following steps (I) and (II):

Step (I) The polymer latex is coagulated into a slurry in which particles thus coagulated are dispersed in water.

Step (II) The slurry obtained in Step (I), an organic liquid almost insoluble in water and incapable of dissolving the polymer and water are mixed for granulation under the conditions that (a) The proportion of water in the whole mixture is 50–85 wt. %, (b) The amount of the organic liquid is 15–150 parts by weight per 100 parts by weight of the polymer in the polymer latex, and (c) The temperature T (°C.) of the whole mixture is maintained for 0.5 minute to 1 hour on average within the range of the following equation:

$$A-40 \leq T \leq A$$

wherein A means the azeotropic temperature (°C.) of the mixture.

In the above process, control of the interfacial tension between the organic liquid and the dispersion medium of the slurry within a specific range has made it possible to control the particle size of the resulting particulate polymer to a desired level.

9 Claims, 1 Drawing Sheet

FIG.1

CONTINUOUS PRODUCTION PROCESS OF PARTICULATE POLYMER AND CONTROL METHOD OF THE PARTICLE SIZE OF SAID POLYMER

This application is a continuation of application Ser. No. 07/345,548, filed on Apr. 14, 1989, now abandoned.

TECHNICAL FIELD

This invention relates to a process for the continuous production of a particulate polymer, and more specifically to a process for the continuous production of a particulate polymer which contains few fine particles and has a narrow particle size distribution and a controlled bulk specific gravity. The present invention is also concerned with a method for controlling the particle size of a particulate polymer, and more specifically with a method for controlling its average particle size while maintaining the narrowness of its particle size distribution.

BACKGROUND ART

A polymer latex obtained by emulsion polymerization generally contains polymer particles which have a particle size of 1 μm or smaller and exist in a state covered with an emulsifier and dispersed and suspended in water. Their particle sizes are too small to permit direct recovery of the polymer by solid-liquid separation. As a conventional method for recovering a polymer from such a polymer latex, it has been widely practiced (1) to use a spray drier so as to directly separate the polymer as a powdery or particulate material or (2) to mix a salt or acid with the polymer latex to coagulate, and then to heat the resultant mixture to solidify the polymer, followed by dewatering and drying to recover the polymer as a powdery or particulate material.

In order to control the particle sizes of the resulting polymer particles, it has also been proposed inter alia (3) to coagulate after dispersing and sphering a polymer latex in a specific solvent (Japanese Patent Laid-Open No. 68285/1977), (4) to add an organic liquid, which is almost insoluble in water and is incapable of dissolving the polymer but is capable of wetting the polymer, to a slurry obtained by coagulating a polymer latex so as to granulate the polymer (Japanese Patent Publication No. 5610/1984), (5) to mix an organic liquid, which is almost insoluble in water and is incapable of dissolving the polymer but is capable of wetting the polymer, with a polymer latex in the presence of a coagulant (Japanese Patent Publication No. 5611/1984), or (6) to disperse droplets of a polymer latex in a coagulating atmosphere by using a spray drier system, thereby semi-coagulating the polymer, and then to solidify the polymer in a coagulating liquid, followed by dewatering and drying (Japanese Patent Laid-Open No. 95905/1981).

Method (1), which uses a spray drier, is however accompanied by the problems that a great deal of drying energy is required because a polymer latex containing a large amount of water is dried as is and a lot of water has to be evaporated, variations tend to occur among the sizes of droplets sprayed and the particle size distribution thus becomes wide, difficulties are encountered in controlling the particle size and/or bulk specific gravity, and a high initial cost is required.

Method (2) featuring coagulation and solidification involves the problems that, when a conventional coagulation and solidification apparatus of the tank or column type is used, the resulting particulate polymer has a broad particle size distribution and fine particles of smaller particle sizes are hence mixed in a large proportion to impair the handling characteristic of the particulate polymer, and especially, fine particles of about 40 μm or smaller are mixed in a proportion of several percent by weight in the whole particles thereby producing dust. This method is unable to reduce the average particle size to 150 μm or smaller.

Method (3) allows, by sphering, control of the particle size distribution and average particle size in a particle size range of 100 μm and greater. This control is however difficult for particle sizes smaller than 100 μm. After the sphering treatment, it is necessary to treat a large amount of solvent used. Further, spherical latex particles are coagulated externally so that their coagulation does not take place uniformly, resulting in a potential problem of fish eyes upon processing of the polymer. Method (4) is used to produce a particulate polymer having a narrow particle size distribution. It is however unable to control the particle size as desired while retaining the narrow range of the particle size distribution. Although not so serious as in method (3), method (4) is also accompanied by the drawback that an organic liquid is added in an amount of 60–500 parts by weight per 100 parts by weight of the polymer and a large amount of the organic liquid must hence be treated. Method (5) is also used to produce a particulate polymer having a narrow particle size distribution. It is however unable to control the average particle size as desired while retaining the narrow range of the particle size distribution. Method (5) is also accompanied by the drawback that an organic liquid is added at a volume ratio of 1–5 relative to the volume of the polymer and a large amount of the organic liquid must hence be treated.

In addition, methods (4) and (5) include an unstable granulation step in that the apparent viscosity of the mixture rapidly increases for a while after the addition of the organic liquid in spite of the inclusion of a suspension stabilizer and surfactant because the addition of the organic liquid is batchwise. Accordingly, the particle size distribution of particles to be produced is significantly affected by the revolution speed of the stirrer, the shape of the stirrer, the amount of the organic liquid used, etc., thereby making it difficult to produce, in a large volume and at a low cost, particles with a controlled particle size distribution and bulk specific gravity. Batchwise granulation shows a different granulation behavior from continuous granulation in which an organic liquid is fed continuously. Batchwise granulation may be described as a different technique from continuous granulation.

Method (6) permits easy formation of a spherical particulate material because it is identical in mechanism to spray drying. It is however accompanied by the drawbacks that there is a limitation to the size of particles and that a large apparatus is required due to the coagulation taking place in a vapor phase.

On the other hand, the automation of metering of powder and the increased size of storage and transportation facilities are being employed. From the standpoint of avoiding the caking powder particles during storage or the clogging of transportation lines due to insufficient flowability of powder, there is a strong demand for the development of a granular polymer which is easy to handle. Resin have recently been required to have special functions. Since this demand for special functions may not be met by a single polymer in many instances, the polymer is often used together with one or more other polymers and one or more modifiers. In this case, it is necessary to control their particle sizes suitably so as to avoid variations in composition due to segregation of the particulate materials in the course of storage or transportation.

Furthermore, when used as a mixture with one or more other particulate materials, the particulate polymer is also required to have a suitable particle size to avoid variations in composition due to segregation of the particulate polymer and/or materials in the course of storage and/or transportation. There is hence a strong demand for the development of a continuous production process for a particulate polymer, which permits control of the bulk specific gravity and the particle size distribution of the particulate polymer.

When a polymer is used in the form of a mixture with one or more other materials, on the other hand, the uniformity of the mixture is enhanced by melting, mixing and kneading them in an extruder or the like. For this application, it is necessary to make the particulate polymer as small as possible so as to reduce as much as possible the proportion of particles of 40 μm or smaller, which adversely affect the handling property of the particulate polymer, and at the same time to facilitate its dispersion upon mixing. There is a strong desire to develop a method for controlling the particle size of a particulate polymer, allowing control of the average particle size while maintaining the particle size distribution narrow as described above

DISCLOSURE OF THE INVENTION

This invention has been completed with a view toward solving the problems of the above-described prior art. In the first aspect of this invention, there is provided a process for the continuous production of a particulate polymer, which successively processes, through the following steps (I) and (II), a polymer latex obtained by emulsion polymerization.

Step (I): The polymer latex is coagulated into a slurry in which particles thus coagulated are dispersed in water.

Step (II): The slurry obtained in Step (I), an organic liquid almost insoluble in water and incapable of dissolving the polymer and optionally water in an amount as required are continuously mixed for granulation under the following conditions (a)–(c):

(a): The proportion of water in the whole mixture is 50–85 wt. %.

(b): The amount of the organic liquid is 15–150 parts by weight per 100 parts by weight of the polymer in the polymer latex.

(c): The temperature T (°C.) of the whole mixture is maintained for 0.5 minute to 1 hour on average within the range of the following equation:

$$A - 40 \leq T \leq A$$

wherein A means the azeotropic temperature (°C.) of the mixture.

It is preferred to conduct Step I) under the following conditions (d) and (e):

(d): The coagulating temperature is lower by at least 10° C. than the glass transition temperature of the polymer in the polymer latex; and (e): Among the particles coagulated, the proportion of particles having a particle size of 100 μm or greater is not greater than 1 wt. %, and to control the proportion of the polymer in the whole mixture within 10–30 wt. % in Step (II).

In addition, the present inventors have also found that in a liquid bridge granulation method, the particle size of a particulate polymer to be obtained can be varied by the controlling the interfacial tension between a dispersion medium (usually, an aqueous solution in which one or more water-soluble impurities are dissolved) and an organic liquid, leading to the second aspect of this invention. In the second aspect of this invention, there is also provided a method for the control of the particle size of a particulate polymer in a liquid bridge granulation process in which a polymer latex obtained by emulsion polymerization is coagulated, the thus-coagulated polymer is dispersed in water to form a slurry, and an organic liquid incapable of dissolving the polymer in the polymer latex and almost insoluble in water is added to the slurry for granulation, which comprises controlling the interfacial tension between the dispersion medium of the slurry and the organic liquid within a range of 0.5–30 dyne/cm.

BEST MODE FOR CARRYING OUT THE INVENTION

The latex to be used in the practice of this invention can be prepared by any routine method and contains an emulsifier, a polymerization initiator, one or more other polymerization aids, etc. The process of this invention can be applied to a coagulable latex of homopolymers, copolymers or graft copolymers. Of course, the process of this invention also can be applied to a mixture of these latexes.

As examples of homopolymer and copolymer latexes, mention may be made of latexes of homopolymers and copolymers of monomers, for example, aromatic vinyl monomers such as styrene, dichlorostyrene α-methylstyrene; vinyl cyanide monomers such as acrylonitrile, methacrylonitrile; vinyl monomers such as alkyl acrylate monomers such as methyl acrylate, ethyl acrylate butyl acrylate; alkyl methacrylate monomers; vinil monomers such as, acrylic acid, vinyl chloride, vinylidene chloride, vinyl acetate; conjugated diolefins such as butadiene, chloroprene, isoprene, their substituted derivatives and ethylene glycol; as well as latex mixtures of such polymers.

As graft copolymer latexes, mention may be made of those obtained by grafting a monomer or monomer mixture, which can form a hard polymer, on an elastic polymer.

Examples of the elastic polymer constituting a graft copolymer latex include diene polymers such as polybutadiene, polyisoprene, polychloroprene; polymers of acrylic acid esters, e.g., $C_{4-10}$-alkyl acrylates such as butyl acrylate, octyl acrylate; and copolymers of the above-exemplified monomers and monomers copolymerizable therewith. Exemplary copolymerizable monomers include aromatic vinyl monomers such as styrene, α-methylstyrene; alkyl methacrylates such as methyl methacrylate, ethyl methacrylate; $C_{1-3}$-alkyl acrylates such as methyl acrylate, ethyl acrylate; and vinyl cyanide compounds such as acrylonitrile, methacrylonitrile.

As monomers capable of forming hard polymers, may be mentioned aromatic vinyl monomers such as styrene, α-methylstyrene; alkyl methacrylates such as methyl methacrylate, ethyl methacrylate, butyl methacrylate; vinyl cyanide monomers such as acrylonitrile, methacrylonitrile; and vinyl halides such as vinyl chloride, vinyl bromide. These monomers may be used either singly or in combination.

No particular limitation are imposed on the coagulant which is used to coagulate the polymer latex in this invention. Any commonly used coagulant can be used. Examples of the coagulant include metal salts such as sodium chloride, calcium chloride, magnesium chloride, sodium sulfate, aluminum sulfate, zinc sulfate, magnesium sulfate, sodium carbonate, sodium hydrogencarbonate, ammonium chloride, potassium alum; acids such as sulfuric acid, hydrochloric acid, phosphoric acid, nitric acid, carbonic acid, acetic acid; and alcohols such as methanol, ethanol. They may be used either singly or in combination. No particular limitation is imposed on the amount of the coagulant to be added. The coagulant is usually added in an amount of about 0.05–50 wt. % based on the solid content of the polymer latex. About 0.1–20 wt. % is preferred. The time required for coagulation is very short and the average residence time may usually be 0.1 minute to 1 hour with 0.5 minute to 10 minutes being preferred.

When the coagulant is added to the polymer latex, the emulsified state of the polymer latex is disrupted so that polymer particles emulsified and dispersed in the polymer latex coagulate together into particles (hereinafter abbreviated as "coagulated particles"), and the coagulated particles are then dispersed in water as the dispersion medium of the polymer latex so as to form a slurry.

In practicing the first aspect of this invention, the temperature at which coagulation is conducted is important for controlling the bulk specific gravity of the particulate polymer. It is necessary to set the temperature at a level at least 10° C. lower than the glass transition temperature of the polymer contained in the polymer latex to be coagulated. The level is hereinafter abbreviated as the "highest coagulating temperature". Use of a coagulating temperature higher than the highest coagulating temperature leads to the development of the problem that the resulting particulate polymer does not have a large bulk specific gravity unless a large amount of the organic liquid is used in Step (II). Although the reason has not been fully elucidated, the following presumption may be made. When the coagulating temperature exceeds the highest coagulating temperature, the surfaces of particles (which will be abbreviated as "fundamental particles". The fundamental particles are considered to be the polymer particles emulsified and dispersed in the polymer latex or those formed of fusion-bonded several particles of the polymer particles) constituting the coagulated particles tend to become sticky, so that they show a greater tendency to form strong melt bonding at points of contact with other fundamental particles. As a result, coagulated particles are formed with a stronger binding force between fundamental particles compared with coagulation at a temperature lower than the highest coagulating temperature. On the other hand, the coagulated particles are in the form of coarse aggregates of fundamental particles, in other words, so-called coarse particles.

Owing to strong coagulating forces caused by "liquid bridge force" which are in turn produced by the organic liquid added in Step (II), and positional rearrangement of the fundamental particles induced by stirring or shaking, the coagulated particles having the above coarse structure are densified by compaction. As the compaction of the coagulated particles proceeds, the organic liquid occluded inside the coagulated particles begins to come to the surfaces of the coagulated particles. Owing to the organic liquid on the surfaces, "liquid bridge force" are produced between the coagulated particles so that the coagulated particles are caused to undergo further the agglomeration and compaction into particles having desired size and apparent density. In polymers coagulated at a temperature higher than the highest coagulating temperature as described above, the binding forces between the fundamental particles are so strong that the fundamental particles can barely undergo positional rearrangement in Step (II). As a result, the resulting particulate polymer has a smaller bulk specific gravity. In order to obtain a particulate polymer having a large bulk specific gravity on the other hand, it is necessary i) to produce large coagulation forces between fundamental particles between which no fusion bonding has occurred, thereby cutting off fusion bonding to facilitate rearrangement of fundamental particles, and ii) to have the organic liquid exist on the surfaces of the coagulated particles so as to promote coagulation and compaction among the "coagulated particles", even when the coagulated particles have not been compacted and the organic liquid occluded internally has not been caused to come to the surfaces of the coagulated particles. The organic liquid hence would appear to be required in a larger amount in Step (II).

When coagulation is carried out at a temperature higher than the highest coagulating temperature, greater coagulated particles tend to occur so that coarse particles of 100 μm and greater tend to be produced. Accordingly, for this reason, it is also desirable that the coagulating temperature not be higher than the highest coagulating temperature.

The glass transition temperature of the polymer, which is required to determine the highest coagulating temperature, can be determined by compression-forming the polymer into a plate 2–5 mm thick and about 5 mm wide and then measuring its dynamic viscoelasticity.

No particular limitation is imposed on the lower limit of the coagulating temperature in Step (I), so long as it is higher than the temperature at which the dispersion medium (water) of the slurry to be obtained in Step (I) freezes. It is however desirable to conduct the coagulation at 20° C. or higher, at which cooling of the polymer latex is not needed, because a polymer latex obtained by a practical emulsion polymerization process has a temperature of at least 20° C.

In Step (I), it is also desirable to conduct the coagulation in such a way that particles having a particle diameter (hereinafter abbreviated as "particle size") of 100 μm or greater contained in the coagulated particles amount to 1 wt. % or less. In particular, when a particulate polymer as a product is granulated into a finer particulate form having an average particle size of 150 μm or smaller, it is more desirable to control their proportion to 0.3 wt. % or less because coagulated particles having a particle diameter of 100 μm or greater form a coarse powder in the particulate polymer, widen the particle size distribution and impair the controllability of the particle size.

The weight fraction of coagulated particles having a particle size of 100 μm or greater can be determined from their weight and from the weight of the remaining coagulated particles. The former weight can be measured by filtering the coagulated slurry through a sieve whose openings are 100 μm wide (a 150-mesh screen can be used), gently adding tap water in an amount of about 10 times the thus-filtered coagulated slurry onto the coagulated particles remaining on the sieve so as to wash, drying them and then measuring the thus-dried coagulated particles. On the other hand, the latter weight can be determined by collecting with a sheet of filter paper the particles passed through the sieve, drying the thus-collected particles and then measuring their weight.

The time required for the coagulation in Step (I) is very short and, as mentioned above, is generally 0.1 minute–1 hour, preferably 0.5 minute–10 minutes in terms of average residence time. If the coagulation time is shorter than 0.1 minute, coagulation is incomplete so that uncoagulated latex flows into Step (I) and tends to render the granulation unstable. Such short coagulation is therefore undesirable. Any coagulation longer than 1 hour requires an unduly large apparatus and therefore is also undesirable.

The organic liquid employed in Step (II) must be almost insoluble in water and must not dissolve the polymer contained in the polymer latex. It is generally desired that the solubility of the organic liquid in water be 0.5 wt. % or lower, with 0.1 wt. % or lower being more preferred. The term "solubility" as used herein means the value measured at 20° C. An organic liquid whose solubility exceeds 0.5 wt. % has a low interfacial tension with water, an aggregating forces based on "liquid bridge force", which are substantially proportional to the interfacial tension, are reduced so that the organic liquid is required in a larger amount to obtain greater aggregating forces. Such an organic liquid is hence not preferred. Furthermore, when the solubility is high, a large amount of the organic liquid is dissolved in the water phase so that the amount of the organic liquid adsorbed on coagulated particles to produce "liquid bridge force" is reduced. Moreover greater facilities are required to treat the organic liquid dissolved in water. The desirable solubility of the organic liquid in water is 0.5 wt. % or lower, with 0.1 wt. % or lower being preferred.

The polymer-dissolving power of an organic liquid cannot be indicated quantitatively. For the sake of convenience, an organic liquid can be selected in the manner described below. The polymer in question is formed into particles having a diameter of about 1 mm or into pellets having a length of about 1 mm per side and is then added to 10 times by weight of the organic liquid, followed by stirring for about 1 hour. When the polymer is dissolved in the organic liquid to form a homogeneous phase or the polymer is partly dissolved in the organic liquid to increase the viscosity of the organic liquid by at least 10% above its original viscosity at this stage, the organic liquid cannot be used for the polymer as an organic liquid for practising this invention. Even when the viscosity increase is not 10% or greater, the organic liquid cannot be used for the polymer as an organic liquid for practising this invention if the particulate or pellet-like polymer subjected to solid-liquid separation from the organic liquid forms together like a millet-and-rice cake or the weight of the polymer increases by 10% or greater compared with the its initial weight, after a 1 minute centrifugal separation of a solvent by a centrifugal force of 100 G.

As has been described above, illustrative examples of the organic liquid usable preferably in Step (II) include paraffinic hydrocarbons such as pentane, hexane, heptane; alicyclic hydrocarbons such as cyclopentane, cyclohexane, methylcyclopentane, methylcyclohexane; and their alkyl-substituted derivatives, although they differ depending on the polymer for which they are used. These organic liquids may be used either singly or in combination.

The organic liquid may be used in a range of 15–150 parts by weight, preferably 20–60 (not inclusive) parts by weight per 100 parts by weight of the polymer in the polymer latex. Any amounts smaller than 15 wt. % are too small to fully exhibit the effect of granulating coagulated particles, so that more fine powder tends to occur thereby making it difficult to control the particle size distribution.

On the other hand, any amounts in excess of 150 wt. % result in unstable dispersion of granulated particles due to the existence of the organic liquid in a great amount, so that re-joining of the particles takes place and coarse particles tend to be produced. It is also necessary to treat a large amount of the organic liquid, so that use of the organic liquid in such a large amount is therefore disadvantageous from the standpoint of energy cost.

The amount of the polymer in the polymer latex can be determined by coagulating the polymer latex with the aforementioned coagulating agent, heating the thus-coagulated polymer latex to conduct a solidification treatment, drying the resultant polymer and then measuring the weight of the polymer. The polymer weight obtained in this manner may include the weights of an emulsifier and polymerization aids such as an initiator added at the time of the emulsion polymerization in some instances. Since the polymer containing these emulsifier and polymerization aids is granulated in this invention, the polymer weight determined in the above-described manner is used as a polymer weight be calculating the amount of the organic liquid or the weight proportion of the polymer in the whole mixture. This weight ratio is commonly called the "solid content of the polymer" in some instances.

The desirable proportion of water in the whole mixture in Step (II) may be 50–85 wt. %, with a range of 50–75 wt. % being preferred. Further, the proportion of the polymer in the whole mixture is desirably in a range of 10–25 wt. %.

If the proportion of water in the whole mixture is smaller than 50 wt. %, the apparent viscosity of the whole mixture increases so that coarse particles tend to be produced. It also becomes difficult to transfer the granulated polymer in the form of a slurry dispersed in water (hereinafter abbreviated as the "granulated particle slurry") by simply allowing it to overflow, whereby more complex facilities are required. If the proportion of water in the whole mixture exceeds 85 wt. %, the resulting particulate polymer has a lowered bulk specific gravity and a still greater amount of water must be treated, leading to the drawback that larger treatment facilities are required.

Polymer proportions smaller than 10 wt. % in the whole mixture result in the same drawback as that brought about when the proportion of water in the whole mixture exceeds 85 wt. %. Polymer proportions greater than 25 wt. % in the whole mixture lead to similar difficulties as in water proportions smaller than 50 wt. % in the whole mixture.

In Step (II), subsequent to continuous addition of the organic liquid, the resultant mixture is maintained for granulation in the temperature range T (°C.) of the following formula for 0.5 minute to 1 hour on average:

$$A - 40 \leq T \leq A,$$

preferably, $A - 25 \leq T \leq A$ wherein A means the azeotropic temperature (°C.) of the mixture. The term "azeotropic temperature" means the lowest temperature at which the mixture boils, and is determined in the following manner. Volatile components in the mixture primarily consist of two components which are water and the organic liquid. Since these two components are substantially not dissolved in each other, the overall vapor pressure of the mixture is indicated by the sum of the vapor pressures of the components in their pure form. The temperature at which the overall vapor pressure becomes equal to the total pressure on the surface of the liquid is the azeotropic temperature A of the mixture.

If the temperature is lower than A−40 (°C.), the speed of granulation becomes extremely slow, so that ungranulated fine powder tends to be produced. If the temperature T exceeds the azeotropic temperature A (°C.) of the mixture, the mixture boils whereby the stable stirring operation is no longer feasible thereby forming coarse particles and making it difficult to control the particle size distribution. If the average granulating time is shorter than 0.5 minutes, the granulation is insufficient so that fine powder tends to be produced. If the average granulating time exceeds 1 hour, an unduly large granulating apparatus is required and such a long average granulating time is hence disadvantageous from the viewpoint of productivity.

A surfactant may be added in Step (II) in order to prevent coarsening of the particles thus granulated or to enhance the flow stability of the slurry containing granulated particles. The surfactant is preferably a surfactant that does not lose its interfacially-activating effects by the coagulant used in Step (I), including by way of example anionic surfactants containing one or more sulfonic groups, such as sodium alkylsulfonates, sodium alkylallylsulfonates, sodium amido sulfonate, sodium dialkylsulfonsuccinates, sodium alkylbenzensulfonates and sodium alkylnaphthalene-sulfonates; and partly-saponified polyvinyl alcohols.

The surfactant may be used in an amount of 0.05-2 wt. %, preferably 0.05-1.5 wt. % based on the organic liquid. Any amounts in excess of 2 wt. % are not preferred, because the polymer is obtained with a lower purity and may result in a product of increased cost.

No particular limitation is imposed on the manner of addition of the surfactant. It can be added in a form either dissolved or dispersed in an organic liquid or water. For further densification of particles granulated continuously as described above, they are usually heated to a temperature 15° C. lower than the glass transition temperature of the polymer or higher than said temperature so as to effect their heat treatment. This treatment is called a "solidification treatment". Although the temperature of the solidification treatment is dependent on the glass transition temperature of the polymer, it is generally conducted at 60°-120° C., and the treatment time is about 1–60 minutes in terms of average residence time.

In the second aspect of this invention, as described above, a polymer latex is coagulated to form a slurry of the coagulated polymer dispersed in water and an organic liquid is added to the slurry, followed by stirring or shaking to granulate the coagulated particles. The organic liquid employed here must be almost insoluble in water and must not dissolve the polymer contained in the polymer latex. For the same reasons as described above, its solubility in water is desirably 0.5 wt. % or lower in general, with 0.1 wt. % or lower being more preferred. Specific examples of usable organic liquids are the same as those described above. These organic liquids may be used either singly or in combination. Further, the organic liquid may be used, for the same reasons as described above, in an amount of from 15 to 150 parts by weight, preferably in an amount of at least 20 parts by weight but less than 60 parts by weight per 100 parts by weight of the polymer in the polymer latex.

In the second aspect of this invention, the particle size of the resulting particulate polymer is adjusted by controlling the interfacial tension between the dispersion medium of the slurry of the coagulated particles and the organic liquid within 0.5-30 dyne/cm, preferably 0.5-20 dyne/cm upon adding the organic liquid to the slurry and stirring or shaking the resultant mixture to granulate the coagulated particles.

If the interfacial tension between the dispersion medium and organic liquid is reduced to a level lower than 0.5 dyne/cm, the "liquid bridge force" by the organic liquid is weakened so that the resulting particulate polymer has a wide particle size distribution, more fine particles are formed and the flowability is deteriorated. Such a low interfacial tension is therefore not preferred. If the interfacial tension exceeds 30 dyne/cm on the other hand, agglomerating forces by "liquid bridge force" become very large. As a result, granulation of coagulated particles proceeds too much, whereby the granulation proceeds to particles having a diameter as large as about 1 cm and stable granulation is hence hardly feasible. In particular, when granulation is carried out in a continuous manner, the inconvenience arises that coarse particles grown to about 1 cm are not discharged from the granulation tank but are accumulated there. In an overflow-type granulation tank 15 such as that depicted in FIG. 1, coarse particles block the overflow line 20 so that it is difficult to conduct a long-term stable operation. It is thus necessary to control the interfacial tension at a level of 30 dyne/cm or lower, preferably 20 dyne/cm or lower, in order to avoid the instability in granulation as described above.

The measurement of the interfacial tension between the dispersion medium and organic liquid is effected at 20° C. in the following manner. The slurry of the coagulated particles is filtered to separate the coagulated particles and dispersion medium from each other. To the dispersion medium, the organic liquid and other additives are added at the same ratios and temperature as those employed when the granulating operation was conducted. After gently stirring the resultant mixture, it is left to stand still so as to form an interface between a phase of the dispersion medium and the phase of the organic liquid. The interfacial tension is then measured. A commercial tensiometer can be used for the measurement of the surface tension. In the Examples described below, "Kyowa CBVP Tensiometer, Model A3" (trade name; manufactured by Kyowa Kagaku Co., Ltd.) and a glass-made plate were used.

If the surface tension between the dispersion medium and organic liquid is reduced to a level lower than 0.5 dyne/cm, the granulation effects by the organic liquid are weakened. Such a low surface tension is hence not preferred.

The surface tension between the dispersion medium and organic liquid can be controlled by adding a surfactant. As the surfactant, it is preferable to choose a surfactant that does not lose its surface activating effects by the coagulant employed for the coagulation of the polymer latex. It is possible to use, for example, an anionic surfactant containing one or more sulfonic groups such as a sodium alkylsulfonate, sodium alkylallylsulfonate, sodium amidesulfonate, sodium dialkylsulfosuccinate, sodium alkylbenzenesulfonate or sodium alkylnaphthalenesulfonate, or a partially-saponified polyvinyl alcohol.

Further, the surfactant may be used in an amount of 0.05-2 wt %, preferably 0.05-1.5 wt. % based on the organic liquid, for the same reasons as described above. Use of the surfactant in any amount greater than 2.0 wt. % lowers the purity of the resultant polymer and results in a final product of a higher production cost. Such a large amount is hence not preferred.

No particular limitation is imposed on the manner of addition of the surfactant. It may be added in a form either dissolved or dispersed in an organic liquid or water.

Figure 1:
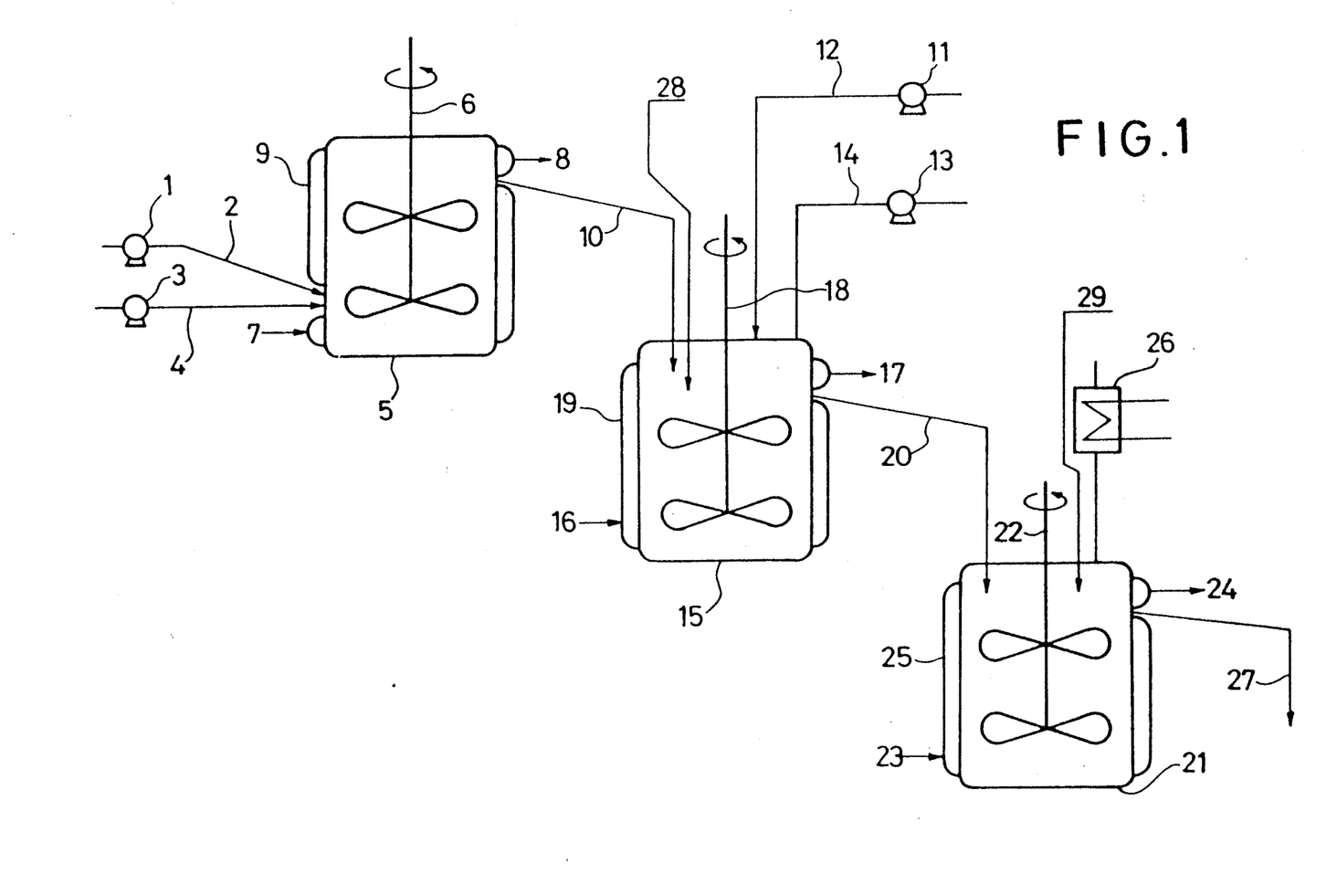
FIG. 1 is a flow chart of a typical apparatus useful in the practice of this invention.

With reference to FIG. 1, typical facilities useful in the practice of both aspects of the present invention will next be described.

A polymer latex is fed through a line 2 to a coagulation tank 5 by means of a metering pump 1. A coagulant is delivered through a line 4 to the coagulation tank 5 by means of a metering pump 3. The coagulation tank 5 is equipped with a jacket 9, which has an inlet 7 and an outlet 8 for temperature-controlling medium, and a stirrer 6. The polymer latex thus fed is coagulated with the coagulant in the coagulation tank. The thus-coagulated latex is converted into a slurry-like form and by either overflow or force feed, is delivered through a line 10 to the granulation tank 15, in which it is continuously mixed with an organic liquid fed by means of a metering pump 11 through a line 12 and water fed as needed by a metering pump 13 through a line 14, thereby granulating the coagulated particles. The granulation tank 15 is equipped with a jacket 19, which has an inlet 16 and an outlet 17 for a temperature-controlling medium, a steam blowing port 28 and a stirrer 18. The slurry with the thus-granulated particles is fed by overflow through a line 20 to a solidification tank 21, in which the particles are subjected to a solidification treatment and at the same time the organic liquid is removed by azeotropic distillation. The solidification tank 21 is fitted with a jacket 25, which has an inlet 23 and an outlet 24 for a temperature-controlling medium, a stirrer 22, a condenser 26 for the recovery of the organic liquid, and a steam-blowing line 29. The slurry which has been subjected to the solidification treatment is drawn out by overflow through a line 27 and is processed through washing and drying steps (not illustrated), whereby the desired particulate polymer is obtained.

The present invention will hereinafter be described further by Examples, which were conducted using similar facilities as shown in FIG. 1. [EXAMPLES]

Example 1

A copolymer latex, which had been obtained by emulsion polymerization of 85 wt. % of methyl methacrylate and 15 wt. % of butyl acrylate and had a solid content of 27.8 wt. %, and the coagulant shown in Table 1 were continuously fed at the respective feed rates given in Table 1 to the coagulation tank 5 by the metering pumps 1,3 respectively. Incidentally, the coagulation tank 5 was cylindrical and its associated stirrer 6 was driven at a revolution speed of about 700 rpm. After the coagulation, the slurry which was a slurry with coagulated particles dispersed in water and will hereinafter be abbreviated a the "coagulated slurry" overflowed through an overflow port of the coagulation tank 5 and entered the granulation tank 15 through the line 10.

When the coagulated slurry started entering the granulation tank 15, an organic liquid and water were fed simultaneously and continuously to the granulation tank 15 by the metering pumps 11,13 respectively. In addition, a surfactant of the kind and amount shown in Table 1 was dissolved in a corresponding medium also shown in Table 1 and was thereafter fed to the granulation tank 15. The granulation tank 15 was cylindrical and its associated stirrer 18 was driven at a revolutional speed of 500 rpm. The granulated slurry overflowed from the coagulation tank 5 and entered the solidification tank 21 through the line 20. Upon an elapsed time of 8 hours after the slurry started overflowing from the solidification tank 21, about 1 l of a slurry sample was collected, dewatered, washed and dried to obtain a particulate polymer. The bulk specific gravity, average particle size, particle size distribution and particle uniformity ratio of the resultant particulate polymer were measured.

The bulk specific gravity was measured in accordance with JIS K-6721, while flowability was determined by placing the particulate material in a bulk specific gravity meter employed in JIS K-6721, observing the outflow state after removing a damper, and then judging the flowability on the basis of the following standard. Outflow state:

O: A sample flowed out naturally as soon as the damper was removed.

X : A sample flowed out continuously after repeated impacts.

XX: A sample did not flow out even after repeated impacts.

Further, each average particle size $D_{50}$ indicates the weight-basis median diameter.

In addition, the uniformity ratio N of the particles was expressed by the following equation:

$$N = D_{75}/D_{25}$$

wherein $D_{75}$ indicates the particle size ($\mu$m) at 75% of a cumulative weight distribution curve of the particles and $D_{25}$ means the particle size ($\mu$m) at 25% of the cumulative weight distribution curve. These measurement methods were used in both the subsequent Examples and Comparative Examples. Measurement results are summarized in Table 1. The organic liquid used was n-hexane, whose azeotropic temperature A with water is about 61° C. A particulate polymer having a narrow particle size distribution, containing only a few fine particles of 37 $\mu$m and smaller and having good flowability was obtained.

Example 2

Under the conditions given in Table 1, a particulate polymer was obtained in the same manner as in Example 1. A particulate polymer having a narrow particle size distribution, as demonstrated by a particle uniformity ratio of 2.5 or smaller, i.e 2.2, containing only a few fine particles and having good flowability was obtained.

Example 3

Under the conditions given 1 Table 1, a particulate polymer was obtained in the same manner as in Example 1. Since n-heptane was used as an organic liquid, the azeotropic temperature A with water was about 79° C. The particulate polymer thus obtained contained only a few fine particles, had a narrow particle size distribution as demonstrated by a particle uniformity ratio of 1.9, and showed good flowability.

Comparative Example 1

Under the conditions given in Table 1, a particulate polymer was obtained in the same manner as in Example 1. Since the temperature T of the mixture in the granulation tank was outside the above-specified range, the particulate polymer contained a lot of coarse particles of 850 μm and greater, the uniformity ratio of the particles was as great as 3.0, and the flowability was poor.

Comparative Example 2

Under the conditions given in Table 1, a particulate polymer was obtained in the same manner as in Example 1. Since the temperature T of the mixture in the granulation tank was higher than the azeotropic temperature, azeotropic boiling took place in the granulation tank so that no stable stirring was feasible inside the tank. The particulate polymer therefore had a particle uniformity ratio N as great as 3.1, contained a lot of coarse particles of 850 μm and greater, and the flowability was poor.

TABLE 1

| | | Example | | | Comparative Example | |
|---|---|---|---|---|---|---|
| | | 1 | 2 | 3 | 1 | 2 |
| Discharge rate of latex (g/min) | | 100 | 100 | 100 | 100 | 100 |
| Coagulant | | | | | | |
| Kind | | | | Sulfuric acid | | |
| Amount per 100 wt. parts of polymer (part) | | 1 | 1 | 1 | 1 | 1 |
| Organic Liquid | | | | | | |
| Kind | | n-Hexane | n-Hexane | n-Heptane | n-Heptane | n-Hexane |
| Amount per 100 wt. parts of polymer (parts) | | 40 | 40 | 40 | 40 | 40 |
| Water | | | | | | |
| Amount per 100 wt. parts of whole mixture (parts) | | 74 | 74 | 74 | 74 | 74 |
| Surfactant | | | | | | |
| Kind | | | | Sodium dodecylbenzenesulfonate | | |
| Weight proportion based on organic liquid (wt. %) | | 0.5 | 0.5 | 0.5 | 0.5 | 0.5 |
| Kind of dissolving medium | | n-Hexane | n-Hexane | n-Heptane | n-Heptane | n-Hexane |
| Coagulation tank | | | | | | |
| Av. residence time (min) | | 4 | 4 | 4 | 4 | 4 |
| Temperature (°C.) | | 18 | 35 | 75 | 75 | 35 |
| Granulation tank | | | | | | |
| Av. residence time (min) | | 6 | 6 | 6 | 6 | 6 |
| Temperature (°C.) | | 35 | 55 | 55 | 37 | 65 |
| Solidification tank | | | | | | |
| Av. residence time (min) | | 28 | 28 | 28 | 28 | 28 |
| Temperature (°C.) | | 98 | 98 | 98 | 98 | 98 |
| Particle size distribution, % | | | | | | |
| +1.4 mm | | 1.1 | 0.4 | 0.4 | 0.5 | 1.3 |
| −1.4 mm | +850 μm | 1.6 | 1.1 | 1.1 | 1.7 | 14.1 |
| −850 μm | +500 μm | 1.6 | 2.3 | 2.7 | 6.7 | 23.3 |
| −500 μm | +212 μm | 23.3 | 30.3 | 29.9 | 27.4 | 37.7 |
| −212 μm | +106 μm | 53.9 | 47.0 | 56.6 | 35.0 | 19.0 |
| −106 μm | +37 μm | 18.4 | 18.9 | 9.3 | 27.2 | 4.1 |
| −37 μm | | 0.1 | 0 | 0 | 1.5 | 0.5 |
| Average particle size (μm) | | 157 | 172 | 177 | 154 | 390 |
| Uniformity ratio of particles | | 1.9 | 2.2 | 1.9 | 3.0 | 3.1 |
| Bulk specific gravity (g/ml) | | 0.41 | 0.42 | 0.41 | 0.33 | 0.31 |
| Flowability | | ○ | ○ | ○ | X | X |

Examples 4-6

A particulate polymer was obtained under the conditions shown in Table 2 and in the same manner as in Example 1 except that the volume of the granulation tank was changed in order to vary the residence time of a mixture in the granulation tank. Since the average residence time of the mixture in the granulation tank was within the prescribed range, the resulting particulate polymer contained only a few fine particles, had a narrow particle size distribution as demonstrated by a particle uniformity ratio smaller than 2.5 and exhibited good flowability.

Comparative Example 3

Under the conditions given in Table 2, a particulate polymer was obtained in the same manner as in Example 1 except that the average residence time in the granulation tank was shortened further. Since the average residence time of the mixture was outside the prescribed range, the resulting particulate polymer contained a lot of fine particles, had a particle uniformity ratio greater than 2.5 and showed poor flowability.

TABLE 2

|  | Example | | | Comp. Ex. |
|---|---|---|---|---|
|  | 4 | 5 | 6 | 3 |
| Discharge rate of latex (g/min) | 100 | 100 | 100 | 100 |
| Coagulant |  |  |  |  |
| Kind | Sulfuric acid | | | |
| Amount per 100 wt. parts of polymer (part) | 1 | 1 | 1 | 1 |
| Organic liquid |  |  |  |  |
| Kind | n-Heptane | | | |
| Amount per 100 wt. parts of polymer (parts) | 30 | 30 | 30 | 30 |
| Water |  |  |  |  |
| Amount per 100 wt. parts of whole mixture (parts) | 75 | 75 | 75 | 75 |
| Surfactant |  |  |  |  |
| Kind | Sodium dodecylbenzenesulfonate | | | |
| Weight proportion based on organic liquid (wt. %) | 0.4 | 0.4 | 0.4 | 0.4 |
| Kind of dissolving medium | n-Heptane | | | |
| Coagulation tank |  |  |  |  |
| Av. residence time (min) | 5 | 5 | 5 | 5 |
| Temperature (°C.) | 70 | 70 | 70 | 70 |
| Granulation tank |  |  |  |  |
| Av. residence time (min) | 0.5 | 1 | 40 | 0.2 |
| Temperature (°C.) | 70 | 70 | 70 | 70 |
| Solidification tank |  |  |  |  |
| Av. residence time (min) | 25 | 25 | 25 | 25 |
| Temperature (°C.) | 98 | 98 | 98 | 98 |
| Particle size distribution, % |  |  |  |  |

TABLE 2-continued

|  |  | Example | | | Comp. Ex. |
|---|---|---|---|---|---|
|  |  | 4 | 5 | 6 | 3 |
|  | +1.4 mm | 0.3 | 0.4 | 0.5 | 0.3 |
| −1.4 mm | +850 μm | 0.5 | 0.6 | 1.2 | 1.5 |
| −850 μm | +500 μm | 1.1 | 2.1 | 4.5 | 4.3 |
| −500 μm | +212 μm | 38.8 | 37.6 | 28.8 | 25.4 |
| −212 μm | +106 μm | 47.3 | 52.2 | 54.6 | 35.5 |
| −106 μm | +37 μm | 11.8 | 7.0 | 10.4 | 31.0 |
| −37 μm |  | 0.2 | 0.1 | 0 | 2.0 |
| Average particle size (μm) | | 187 | 188 | 175 | 150 |
| Uniformity ratio of particles | | 2.0 | 2.0 | 2.0 | 2.8 |
| Bulk specific gravity (g/ml) | | 0.41 | 0.40 | 0.41 | 0.29 |
| Flowability | | ○ | ○ | ○ | X |

Examples 7 and 8

Separately using two kinds of anionic surfactants, one being sodium dioctylsulfosuccinate and the other sodium dodecylbenzenesulfonate both containing a sulfonic group in their molecules, particulate polymers were respectively obtained under conditions shown in Table 3 and in the same manner as in Example 1.

The resulting particulate polymers contained only a few fine particles, had a narrow particle size distribution as demonstrated by a particle uniformity ratio smaller than 2.5 and showed good flowability.

Example 9

Using a polyvinyl alcohol having a degree of polymerization of about 500, particulate polymer was obtained under conditions shown in Table 3 and in the same manner as in Example 1.

The resulting particulate polymer contained only a few fine particles, had a narrow particle size distribution as demonstrated by a particle uniformity ratio smaller than 2.5 and showed good flowability.

TABLE 3

|  | Example | | |
|---|---|---|---|
|  | 7 | 8 | 9 |
| Discharge rate of latex (g/min) | 100 | 100 | 100 |
| Coagulant |  |  |  |
| Kind | Sulfuric acid | | |
| Amount per 100 wt. parts of polymer (part) | 1 | 1 | 1 |
| Organic liquid |  |  |  |
| Kind | n-Heptane | | |
| Amount per 100 wt. parts of polymer (parts) | 40 | 40 | 40 |
| Water |  |  |  |
| Amount per 100 wt. parts of whole mixture (parts) | 74 | 74 | 74 |
| Surfactant |  |  |  |
| Kind | Sodium dioctyl-sulfosuccinate | Sodium dodecyl-benzenesulfonate | Polyvinyl alcohol (Polyvenization-degree: about 500) |
| Weight proportion based on organic liquid (wt. %) | 0.5 | 0.5 | 0.5 |
| Kind of dissolving medium | water | | |
| Coagulation tank |  |  |  |
| Av. residence time (min) | 4 | 4 | 4 |
| Temperature (°C.) | 65 | 65 | 65 |
| Granulation tank |  |  |  |
| Av. residence time (min) | 5 | 5 | 5 |
| Temperature (°C.) | 70 | 70 | 70 |
| Solidification tank |  |  |  |
| Av. residence time (min) | 28 | 28 | 28 |
| Temperature (°C.) | 98 | 98 | 98 |
| Particle size distribution, % |  |  |  |

TABLE 3-continued

|  |  | Example | | |
|---|---|---|---|---|
|  |  | 7 | 8 | 9 |
|  | +1.4 mm | 0.4 | 0.8 | 0.5 |
| −1.4 mm | +850 μm | 0.9 | 0.9 | 0.7 |
| −850 μm | +500 μm | 5.2 | 1.8 | 4.1 |
| −500 μm | +212 μm | 30.6 | 18.3 | 41.0 |
| −212 μm | +106 μm | 57.2 | 73.9 | 48.0 |
| −106 μm | +37 μm | 5.6 | 4.3 | 5.7 |
| −37 μm |  | 0.1 | 0 | 0 |
| Average particle size (μm) | | 177 | 171 | 202 |
| Uniformity ratio of particles | | 2.1 | 1.5 | 1.9 |
| Bulk specific gravity (g/ml) | | 0.42 | 0.41 | 0.41 |
| Flowability | | ◯ | ◯ | ◯ |

Examples 10–14

Particulate polymers were separately obtained under the conditions given in Table 4 and in the same manner as in Example 1. The resulting particulate polymers contained only a few fine particles, had a narrow particle distribution as demonstrated by a particle uniformity ratio smaller than 2.5 and showed good flowability. The bulk specific gravity was observed to increase as the weight proportion of water in the whole mixture decreased, so that control of the bulk specific gravity was controllable.

Comparative Example 4

Under the conditions as shown in Table 4, a similar operation as in Example 1 was conducted. Since the proportion of the water in the whole mixture in the granulation tank 15 was little, the line 20 was blocked about 10 minutes later from the time at which the slurry was discharged from the discharge line 20 of the coagulation tank 1. Therefore, it was no longer possible to discharge the slurry to the solidification tank.

TABLE 4

|  |  | Example | | | | | Comp. Ex. |
|---|---|---|---|---|---|---|---|
|  |  | 10 | 11 | 12 | 13 | 14 | 4 |
| Discharge rate of latex (g/min) | | 100 | 100 | 100 | 100 | 100 | 100 |
| Coagulant | | | | | | | |
| Kind | | | | Sulfuric acid | | | |
| Amount per 100 wt. parts of polymer (part) | | 1 | 1 | 1 | 1 | 1 | 1 |
| Organic liquid | | | | | | | |
| Kind | | | | n-Hexane | | | |
| Amount per 100 wt. parts of polymer (parts) | | 145 | 145 | 145 | 145 | 145 | 200 |
| Water | | | | | | | |
| Amount per 100 wt. parts of whole mixture (parts) | | 52 | 63 | 72 | 75 | 79 | 47 |
| Surfactant | | | | | | | |
| Kind | | | | Sodium dioctylsulfosuccinate | | | |
| Weight proportion based on organic liquid (wt. %) | | 0.4 | 0.4 | 0.4 | 0.4 | 0.4 | 0.4 |
| Kind of dissolving medium | | | | n-Hexane | | | |
| Coagulation tank | | | | | | | |
| Av. residence time (min) | | 5 | 5 | 5 | 5 | 5 | 5 |
| Temperature (°C.) | | 55 | 55 | 55 | 55 | 55 | 55 |
| Granulation tank | | | | | | | |
| Av. residence time (min) | | 5 | 4 | 3 | 3 | 2 | 5 |
| Temperature (°C.) | | 58 | 58 | 58 | 58 | 58 | 58 |
| Solidification tank | | | | | | | |
| Av. residence time (min) | | 27 | 21 | 17 | 15 | 12 | 23 |
| Temperature (°C.) | | 98 | 98 | 98 | 98 | 98 | 98 |
| Particle size distribution, % | | | | | | | |
|  | +1.4 mm | 0.7 | 0.6 | 0.4 | 1.3 | 0.5 | — |
| −1.4 mm | +850 μm | 1.8 | 1.2 | 1.0 | 1.7 | 0.4 | — |
| −850 μm | +500 μm | 6.7 | 4.2 | 5.9 | 3.5 | 2.0 | — |
| −500 μm | +212 μm | 33.3 | 27.4 | 33.5 | 35.2 | 31.7 | — |
| −212 μm | +106 μm | 47.8 | 63.3 | 48.9 | 55.0 | 60.0 | — |
| −106 μm | +37 μm | 9.5 | 3.3 | 10.2 | 3.3 | 5.2 | — |
| −37 μm | | 0.2 | 0 | 0.1 | 0 | 0.2 | — |
| Average particle size (μm) | | 189 | 184 | 190 | 196 | 184 | — |
| Uniformity ratio of particles | | 2.3 | 1.7 | 2.0 | 1.7 | 1.7 | — |
| Bulk specific gravity (g/ml) | | 0.48 | 0.45 | 0.41 | 0.36 | 0.34 | — |
| Flowability | | ◯ | ◯ | ◯ | ◯ | ◯ | — |

Examples 15–16

Particulate polymers were separately obtained under the conditions shown in Table 5 and in the same manner as in Example 1 except that the amount of the organic liquid used was changed to 20 parts by weight and 100 parts by weight respectively per 100 parts by weight of the solid content of the polymer latex. The resulting particulate polymers contained only a few fine particles, had a narrow particle size distribution as demonstrated by a particle size ratio smaller than 2.5 and exhibited good low flowability.

Comparative Example 5

Under the conditions given in Table 5, a particulate polymer was obtained in the same manner as in Example 1 without using any organic liquid. The resulting particulate polymer contained a lot of fine particles, had a wide particle size distribution as demonstrated by a particle uniformity ratio as great as 3.2, and showed poor flowability. Comparative Example 6

A particulate polymer was obtained under the conditions given in Table 5 and in the same manner as in Example 1 except that the amount of the used organic liquid was changed to 10 parts by weight per 100 parts by weight of solids in the polymer latex. The resulting particulate polymer contained a lot of fine particles, had a wide particle size distribution as demonstrated by a particle uniformity ratio as great as 3.2, and showed poor flowability.

Comparative Example 7

A particulate polymer was obtained under the conditions given in Table 5 and in the same manner as in Example 1 except that the amount of the used organic liquid was changed to 180 parts by weight per 100 parts by weight of solids in the polymer latex. Although the resulting particulate polymer contained only a few fine particles, it had a particle uniformity ratio as poor as 3.5, contained a lot of coarse particles of 850 μm and greater and showed poor flowability.

TABLE 5

|  |  | Example | | Comparative Example | | |
| --- | --- | --- | --- | --- | --- | --- |
|  |  | 15 | 16 | 5 | 6 | 7 |
| Discharge rate of latex (g/min) |  | 100 | 100 | 100 | 100 | 100 |
| Coagulant |  |  |  |  |  |  |
| Kind |  |  |  | Sulfuric acid | | |
| Amount per 100 wt. parts of polymer (part) |  | 1 | 1 | 1 | 1 | 1 |
| Organic tank |  |  |  |  |  |  |
| Kind |  | n-Hexane | n-Hexane | none | n-Heptane | n-Heptane |
| Amount per 100 wt. parts of polymer (parts) |  | 20 | 100 | 0 | 10 | 180 |
| Water |  |  |  |  |  |  |
| Amount per 100 wt. parts of whole mixture (parts) |  | 71 | 60 | 75 | 73 | 52 |
| Surfactant |  |  |  |  |  |  |
| Kind |  | Sodium dodecyl-benzene-sulfonate | Sodium dodecyl benzene-sulfonate | none | Sodium dodecyl benzene-sulfonate | Sodium dodecyl benzene-sulfonate |
| Weight proportion based on organic liquid (wt. %) |  | 0.6 | 0.6 | 0.6 | 0.6 | 0.6 |
| Kind of dissolving medium |  | water | water | none | water | water |
| Coagulation tank |  |  |  |  |  |  |
| Av. residence time (min) |  | 5 | 5 | — | — | — |
| Temperature (°C.) |  | 55 | 55 | 55 | 55 | 55 |
| Granulation tank |  |  |  |  |  |  |
| Av. residence time (min) |  | 7 | 6 | 8 | 7 | 5 |
| Temperature (°C.) |  | 55 | 55 | 55 | 55 | 55 |
| Solidification tank |  |  |  |  |  |  |
| Av. residence time (min) |  | 35 | 30 | 40 | 40 | 27 |
| Temperature (°C.) |  | 98 | 98 | 98 | 98 | 98 |
| Particle size distribution, % |  |  |  |  |  |  |
|  | +1.4 mm | 2.4 | 2.7 | 0.7 | 0.3 | 20.9 |
| −1.4 mm | +850 μm | 2.3 | 2.4 | 1.2 | 1.1 | 13.8 |
| −850 μm | +500 μm | 2.4 | 2.5 | 3.0 | 4.0 | 18.1 |
| −500 μm | +212 μm | 19.6 | 8.9 | 21.9 | 29.2 | 42.7 |
| −212 μm | +106 μm | 47.6 | 74.0 | 25.7 | 29.5 | 4.3 |
| −106 μm | +37 μm | 25.5 | 9.5 | 44.2 | 32.7 | 0.2 |
| −37 μm |  | 0.2 | 0 | 3.3 | 2.3 | 0 |
| Average particle size (μm) |  | 152 | 141 | 113 | 157 | 542 |
| Uniformity ratio of particles |  | 2.1 | 1.5 | 3.2 | 3.2 | 3.5 |
| Bulk specific gravity (g/ml) |  | 0.42 | 0.44 | 0.28 | 0.31 | 0.49 |
| Flowability |  | ○ | ○ | X | X | X |

Example 17

A particulate polymer was obtained under conditions given in Table 6 and in the same manner as in Example 6 except that the stirring revolutional speeds in the coagulation and granulation tanks were both set at 1200 rpm. The particulate polymer had a narrow particle size distribution as demonstrated by a particle uniformity ratio smaller than 2.5 and showed good flowability.

TABLE 6

|  | Example 17 |
| --- | --- |
| Discharge rate of latex (g/min) | 100 |
| Coagulant |  |

TABLE 6-continued

| | Example 17 |
|---|---|
| Kind | Sulfuric acid |
| Amount per 100 wt. parts of polymer (part) | 1 |
| Organic tank | |
| Kind | n-Hexane |
| Amount per 100 wt. parts of polymer (parts) | 50 |
| Water | |
| Amount per 100 wt. parts of whole mixture (parts) | 75 |
| Surfactant | |
| Kind | Sodium dodecylbenzenesulfonate |
| Weight proportion based on organic liquid (wt. %) | 0.2 |
| Kind of dissolving medium | water |
| Coagulation tank | |
| Av. residence time (min) | 4 |
| Temperature (°C.) | 40 |
| Granulation tank | |
| Av. residence time (min) | 4 |
| Temperature (°C.) | 55 |
| Solidification tank | |
| Av. residence time (min) | 16 |
| Temperature (°C.) | 95 |
| Particle size distribution, % | |
| +1.4 mm | 0.8 |
| −1.4 mm  +850 μm | 0.6 |
| −850 μm  +500 μm | 1.5 |
| −500 μm  +212 μm | 41.9 |
| −212 μm  +106 μm | 46.4 |
| −106 μm  +37 μm | 8.4 |
| −37 μm | 0.4 |
| Average particle size (μm) | 198 |
| Uniformity ratio of particles | 1.8 |
| Bulk specific gravity (g/ml) | 0.35 |
| Flowability | ○ |

Examples 18–20

Particulate polymers were separately obtained under the conditions given in Table 7 and in the same manner as in Example 17. The bulk specific gravity increased as the weight fraction of the polymer to the whole mixture in the granulation tank became higher.

Comparative Example 8

A particulate polymer was obtained in the same manner as in Examples 18–20 except that the weight fraction of the polymer to the whole mixture in the granulation tank was as small as 8%. The bulk specific gravity of the resulting particulate polymer was however very low.

TABLE 7

| | Example | | | Comp. Ex. |
|---|---|---|---|---|
| | 18 | 19 | 20 | 8 |
| Discharge rate of latex (g/min) | 100 | 100 | 100 | 100 |
| Coagulant | | | | |
| Kind | Sulfuric acid | | | |
| Amount per 100 wt. parts of polymer (part) | 1 | 1 | 1 | 1 |
| Organic tank | | | | |
| Kind | n-Hexane | | | |
| Amount per 100 wt. parts of polymer (parts) | 50 | 50 | 50 | 50 |
| Water | | | | |
| Amount per 100 wt. parts of whole mixture (parts) | 79 | 73 | 67 | 88 |
| Surfactant | | | | |
| Kind | Sodium dioctylsulfosuccinate | | | |
| Weight proportion based on organic liquid (wt. %) | 0.2 | 0.2 | 0.2 | 0.2 |
| Kind of dissolving medium | n-Hexane | | | |
| Coagulation tank | | | | |
| Av. residence time (min) | 5 | 5 | 5 | 5 |
| Temperature (°C.) | 40 | 40 | 40 | 40 |
| Granulation tank | | | | |
| Av. residence time (min) | 3 | 4 | 5 | 2 |
| Temperature (°C.) | 55 | 55 | 55 | 55 |
| Concentration of polymer (wt. %) | 14 | 18 | 22 | 8 |
| Solidification tank | | | | |
| Temperature (°C.) | 95 | 95 | 95 | 95 |
| Particle size distribution, % | | | | |
| +1.4 mm | 1.0 | 1.1 | 0.7 | 1.0 |
| −1.4 mm  +850 μm | 0.6 | 0.4 | 0.8 | 0.8 |
| −850 μm  +500 μm | 1.7 | 1.1 | 0.9 | 1.7 |
| −500 μm  +212 μm | 37.6 | 33.1 | 16.3 | 40.5 |
| −212 μm  +106 μm | 48.9 | 52.9 | 62.7 | 48.3 |
| −106 μm  +37 μm | 10.2 | 11.0 | 17.8 | 7.3 |
| −37 μm | 0 | 0.4 | 0.8 | 0.4 |
| Average particle size (μm) | 190 | 181 | 172 | 197 |
| Uniformity ratio of particles | 1.8 | 1.9 | 1.5 | 1.9 |
| Bulk specific gravity (g/ml) | 0.31 | 0.35 | 0.36 | 0.17 |
| Flowability | ○ | ○ | ○ | ○ |

Examples 21–23

Using a copolymer latex prepared from 90 wt. % of methyl methacrylate and 10 wt. % of butyl acrylate and having a solid content of 27.8 wt. %, particulate polymers were separately obtained under the conditions given in Table 8 and in the same manner as in Example 1. The resulting particulate polymers had a narrow particle size distribution as demonstrated by a particle uniformity ratio smaller than 2.5 and exhibited good flowability.

TABLE 8

| | Example | | |
|---|---|---|---|
| | 21 | 22 | 23 |
| Discharge rate of latex (g/min) | 100 | 100 | 100 |
| Coagulant | | | |
| Kind | Sulfuric acid | Sulfuric acid | aluminum sulfate |
| Amount per 100 wt. parts of polymer (part) | 0.4 | 0.4 | 0.08 |
| Organic tank | | | |
| Kind | n-Heptane | | |
| Amount per 100 wt. parts of polymer (parts) | 50 | 50 | 50 |
| Water | | | |
| Amount per 100 wt. parts of whole mixture (parts) | 75 | 75 | 75 |
| Surfactant | | | |

TABLE 8-continued

|  |  | Example | | |
|---|---|---|---|---|
|  |  | 21 | 22 | 23 |
| Kind |  | — | Sodium dioctyl-sulfosuccinate | — |
| Weight proportion based on organic liquid (wt. %) |  | 0 | 0.02 | 0 |
| Kind of dissolving medium |  | — | n-Heptane | — |
| Coagulation tank |  |  |  |  |
| Av. residence time (min) |  | 4 | 4 | 4 |
| Temperature (°C.) |  | 40 | 40 | 40 |
| Granulation tank |  |  |  |  |
| Av. residence time (min) |  | 4 | 4 | 4 |
| Temperature (°C.) |  | 55 | 55 | 55 |
| Solidification tank |  |  |  |  |
| Av. residence time (min) |  | 15 | 15 | 15 |
| Temperature (°C.) |  | 95 | 95 | 95 |
| Particle size distribution, % |  |  |  |  |
|  | +1.4 mm | 1.6 | 1.6 | 1.3 |
| −1.4 mm | +850 μm | 0.9 | 0.9 | 0.7 |
| −850 μm | +500 μm | 2.4 | 1.2 | 0.9 |
| −500 μm | +212 μm | 14.7 | 7.4 | 16.6 |
| −212 μm | +106 μm | 57.0 | 19.6 | 61.4 |
| −106 μm | +37 μm | 22.6 | 68.8 | 18.6 |
| −37 μm |  | 0.8 | 0.5 | 0.5 |
| Average particle size (μm) |  | 137 | 90 | 148 |
| Uniformity ratio of particles |  | 1.8 | 1.7 | 1.8 |
| Bulk specific gravity (g/ml) |  | 0.36 | 0.36 | 0.35 |
| Flowability |  | ○ | ○ | ○ |

Examples 24–27

A copolymer latex, which had been obtained by emulsion polymerization of 85 wt. % of methyl methacrylate and 15 wt. % of butyl acrylate and had a solid content of 27.8 wt. %, and one of coagulants shown in Table 9 were continuously fed at their respective feed rates given in Table 9 to the coagulation tank 5 by the metering pumps 1,3, respectively. The coagulation tank 5 was cylindrical and its associated stirrer 6 was driven at a revolutional speed of 700 rpm. The coagulated slurry overflowed through an overflow port of the coagulation tank 5 and entered the granulation tank 15 through the line 10.

When the coagulated slurry started entering the granulation tank 15, an organic liquid and water were fed simultaneously and continuously to the granulation tank 15 by the metering pumps 11,13, respectively. In addition, one of surfactants of the kinds and amounts shown in Table 9 was dissolved in a corresponding medium also shown in Table 9 and was thereafter fed to the granulation tank 15. The granulation tank 15 was cylindrical and its associated stirrer 18 was driven at a revolutional speed of 500 rpm.

The granulated slurry overflowed from the coagulation tank 5 and entered the solidification tank 21 through the line 20. Upon an elapsed time of 8 hours after the slurry started overflowing from the solidification tank 21, about 1 l of a slurry sample was collected, dewatered, washed and dried to obtain a particulate polymer. The bulk specific gravity, average particle size, particle size distribution and particle uniformity ratio of the resulting particulate polymer were measured.

The interfacial tension between the dispersion medium and organic liquid was determined by placing a mixture, which had been prepared by adding water, the surfactant and the organic liquid to the dispersion medium obtained by solid-liquid separation of the slurry overflowed from the coagulation tank 5 in such a way that their proportions and the temperature became equal to those employed at the time of the granulation, in a sealed container, stirring the mixture for 1 hour, allowing the mixture to stand still, transferring the resultant mixture to an interfacial-tension-measuring Petri dish, and then measuring it by "Kyowa CBVP Tensiometer, Model A3" (trade name; manufactured by Kyowa Kagaku Co., Ltd.) and a glass-made plate. This measuring method of interfacial tensions were used both in Examples and Comparative Examples described below. Measurement results are summarized in Table 9. Particulate polymers containing only a few fine particles, having a narrow particle size distribution as demonstrated by a particle uniformity ratio smaller than 2.5 and having good flowability were obtained. Further, the average particle size decreased as the weight ratio of the surfactant to the organic liquid increased, whereby control of the average particle size was feasible.

Comparative Examples 9

In the same manner as in Example 27 except that the surfactant added was increased to an amount shown in Table 9, a particulate polymer was obtained from the same copolymer latex. The average particle size of the resulting particulate polymer was smaller than the particulate polymer of Example 27. Since the interfacial tension between the dispersion medium and organic liquid (n-heptane) was too low due to the addition of the surfactant in the excessively large amount, the particle size distribution was wide as demonstrated by a particle uniformity ratio of 2.9 and fine particles of 37 μm and smaller were contained in an extremely large proportion.

Comparative Example 10

It was attempted to obtain a particulate polymer by using the same copolymer latex as in Example 24 in the same manner as in Example 24 except that no surfactant was used. Due to the unduly large interfacial tension between the dispersion medium and organic liquid (n- heptane), coarse particles however accumulated in the granulation tank, and the overflow line 20 was blocked about 10 minutes later so that no stable granulation was feasible.

TABLE 9

|  | | Example | | | | Comp. Ex. |
|---|---|---|---|---|---|---|
|  | 24 | 25 | 26 | 27 | 9 | 10 |
| Discharge rate of latex (g/min) | 100 | 100 | 100 | 100 | 100 | 100 |
| Coagulant | | | | | | |
| Kind | | | Aluminum sulfate | | | |
| Amount per 100 wt. parts of polymer (part) | 1 | 1 | 1 | 1 | 1 | 1 |
| Organic tank | | | | | | |
| Kind | | | n-Heptane | | | |
| Amount per 100 wt. parts of polymer (parts) | 55 | 55 | 55 | 55 | 55 | 55 |
| Water | | | | | | |
| Amount per 100 wt. parts of whole mixture (parts) | 72 | 72 | 72 | 72 | 72 | 72 |
| Surfactant | | | | | | |
| Kind | Sodium dioctyl-sulfosuccinate | Sodium dioctyl-sulfosuccinate | Sodium dioctyl-sulfosuccinate | Sodium dioctyl-sulfosuccinate | Sodium dioctyl-sulfosuccinate | none |
| Weight proportion based on organic liquid (wt. %) | 0.2 | 0.4 | 1.0 | 2.0 | 4 | 0 |
| Kind of dissolving medium | | | n-Heptane | | | |
| Coagulation tank | | | | | | |
| Av. residence time (min) | 5 | 5 | 5 | 5 | 5 | 5 |
| Temperature (°C.) | 65 | 65 | 65 | 65 | 65 | 65 |
| Granulation tank | | | | | | |
| Av. residence time (min) | 5 | 5 | 5 | 5 | 5 | 5 |
| Temperature (°C.) | 70 | 70 | 70 | 70 | 70 | 70 |
| Solidification tank | | | | | | |
| Av. residence time (min) | 26 | 26 | 26 | 26 | 26 | 26 |
| Temperature (°C.) | 98 | 98 | 98 | 98 | 98 | 98 |
| Particle size distribution, % | | | | | | |
| +1.4 mm | 1.3 | 0.9 | 0.6 | 0.6 | 0 | — |
| −1.4 mm  +850 μm | 3.8 | 1.3 | 0.7 | 0.9 | 0 | — |
| −850 μm  +500 μm | 9.4 | 3.4 | 1.3 | 1.1 | 0.2 | — |
| −500 μm  +212 μm | 36.9 | 31.2 | 16.2 | 10.1 | 3.5 | — |
| −212 μm  +106 μm | 45.0 | 57.9 | 65.3 | 53.7 | 6.2 | — |
| −106 μm  +37 μm | 3.5 | 5.3 | 15.9 | 33.5 | 62.3 | — |
| −37 μm | 0.1 | 0 | 0 | 0.1 | 27.8 | — |
| Average particle size (μm) | 215 | 182 | 137 | 123 | 60 | — |
| Uniformity ratio of particles | 2.4 | 1.9 | 1.7 | 1.8 | 2.9 | — |
| Bulk specific gravity (g/ml) | 0.42 | 0.40 | 0.40 | 0.41 | 0.29 | — |
| Flowability | ○ | ○ | ○ | ○ | X | — |
| Surface tension between dispersing medium and organic liquid (dyne/cm) | 15.2 | 11.6 | 7.6 | 4.3 | 0.2 | 31.2 |

Examples 28–30

Particulate polymers were separately obtained under the conditions given in Table 10 and in the same manner as in Example 24 except that a copolymer latex prepared from 80 wt. % of methyl methacrylate and 20 wt. % of butyl acrylate and having a solid content of 27.8 wt. % was used and the stirring revolutional speeds in the coagulation tank 5 and granulation tank 15 (namely, the revolutional speeds of the stirrer 6 and stirrer 18) were changed to 1200 rpm.

The resulting particulate polymers contained only a little fine particles, had a narrow particle size distribution and showed good flowability. Further, the average particle size decreased as the surfactant added was increased, whereby control of the average particle size was feasible.

TABLE 10

|  | Example | | |
|---|---|---|---|
|  | 28 | 29 | 30 |
| Discharge rate of latex (g/min) | 100 | 100 | 100 |
| Coagulant | | | |
| Kind | | Sulfuric acid | |
| Amount per 100 wt. parts of polymer (part) | 1 | 1 | 1 |
| Organic tank | | | |
| Kind | | n-Hexane | |
| Amount per 100 wt. parts of polymer (parts) | 50 | 50 | 50 |
| Water | | | |
| Amount per 100 wt. parts of whole mixture (parts) | 70 | 70 | 70 |
| Surfactant | | | |
| Kind | | Sodium dodecyl-benzenesulfonate | |
| Weight proportion based on organic liquid (wt. %) | 0.1 | 0.3 | 0.5 |
| Kind of dissolving medium | | water | |
| Coagulation tank | | | |
| Av. residence time (min) | 5 | 5 | 5 |
| Temperature (°C.) | 55 | 55 | 55 |
| Granulation tank | | | |
| Av. residence time (min) | 5 | 5 | 5 |

TABLE 10-continued

|  |  | Example |  |  |
|---|---|---|---|---|
|  |  | 28 | 29 | 30 |
| Temperature (°C.) Solidification tank |  | 55 | 55 | 55 |
| Temperature (°C.) |  | 95 | 95 | 95 |
| Particle size distribution, % |  |  |  |  |
|  | +1.4 mm | 1.2 | 1.6 | 1.3 |
| −1.4 mm | +850 μm | 1.0 | 0.9 | 0.9 |
| −850 μm | +500 μm | 1.7 | 1.0 | 0.7 |
| −500 μm | +212 μm | 52.2 | 13.7 | 3.8 |
| −212 μm | +106 μm | 37.2 | 58.1 | 31.9 |
| −106 μm | +37 μm | 6.3 | 24.1 | 59.9 |
| −37 μm |  | 0.4 | 0.6 | 1.5 |
| Average particle size (μm) |  | 232 | 139 | 92 |
| Uniformity ratio of particles |  | 1.9 | 1.8 | 2.1 |
| Bulk specific gravity (g/ml) |  | 0.41 | 0.41 | 0.40 |
| Flowability |  | ○ | ○ | ○ |
| Surface tension between dispersing medium and organic liquid (dyne/cm) |  | 15.1 | 12.2 | 10.3 |

Examples 31–33

Particulate polymers were separately obtained by conducting granulation under the conditions given in Table 11 and in the same manner as in Example 28 except that a copolymer latex prepared by graft-polymerizing 15 parts by weight of methyl methacrylate and 25 parts by weight of styrene on 60 parts by weight of a rubbery polymer composed of 75 wt. % of butadiene and 25 wt. % of styrene.

The resulting particulate polymers contained only a few fine particles, had a narrow particle size distribution and showed good flowability. Further, the average particle size decreased as more surfactant was added, whereby control of the average particle size was feasible.

TABLE 11

|  |  | Example |  |  |
|---|---|---|---|---|
|  |  | 31 | 32 | 33 |
| Discharge rate of latex (g/min) |  | 70 | 70 | 70 |
| Coagulant |  |  |  |  |
| Kind |  |  | Sulfuric acid |  |
| Amount per 100 wt. parts of polymer (part) |  | 0.2 | 0.2 | 0.2 |
| Organic tank |  |  |  |  |
| Kind |  |  | n-Heptane |  |
| Amount per 100 wt. parts of polymer (parts) |  | 120 | 120 | 120 |
| Water |  |  |  |  |
| Amount per 100 wt. parts of whole mixture (parts) |  | 71 | 71 | 71 |
| Surfactant |  |  |  |  |
| Kind |  |  | Sodium dodecyl-benzenesulfonate |  |
| Weight proportion based on organic liquid (wt. %) |  | 0.1 | 0.5 | 1.0 |
| Kind of dissolving medium |  |  | water |  |
| Coagulation tank |  |  |  |  |
| Av. residence time (min) |  | 5 | 5 | 5 |
| Temperature (°C.) |  | 30 | 30 | 30 |
| Granulation tank |  |  |  |  |
| Av. residence time (min) |  | 5 | 5 | 5 |
| Temperature (°C.) |  | 50 | 50 | 50 |
| Solidification tank |  |  |  |  |
| Temperature (°C.) |  | 95 | 95 | 95 |
| Particle size distribution, % |  |  |  |  |
|  | +1.4 mm | 0.3 | 1.5 | 1.5 |
| −1.4 mm | +850 μm | 0.4 | 1.4 | 0.7 |

TABLE 11-continued

|  |  | Example |  |  |
|---|---|---|---|---|
|  |  | 31 | 32 | 33 |
| −850 μm | +500 μm | 2.1 | 1.6 | 0.6 |
| −500 μm | +212 μm | 40.7 | 15.2 | 3.3 |
| −212 μm | +106 μm | 52.3 | 55.8 | 38.2 |
| −106 μm | +37 μm | 4.0 | 24.2 | 54.4 |
| −37 μm |  | 0.2 | 0.2 | 1.2 |
| Average particle size (μm) |  | 198 | 156 | 98 |
| Uniformity ratio of particles |  | 1.7 | 1.9 | 1.9 |
| Bulk specific gravity (g/ml) |  | 0.34 | 0.33 | 0.33 |
| Flowability |  | ○ | ○ | ○ |
| Surface tension between dispersing medium and organic liquid (dyne/cm) |  | 11.5 | 7.8 | 6.2 |

The present invention has brought about excellent advantages. For example, a particulate polymer containing only a few fine particles and having a narrow particle size distribution and a controlled bulk specific gravity can be obtained in accordance with the process of this invention. Since the organic liquid employed is only sparingly soluble in water and its amount is a little, smaller facilities can be used successfully and the running cost required for the recovery of the organic liquid is very low. A polymer obtained by emulsion polymerization can be granulated economically by the present invention. It is also possible to freely control the particle size of the particulate polymer which contains only a little fine particles and has a narrow particle size distribution, thereby making it possible to provide a particular polymer having a particle size most suitable for a given end use.

We claim:

1. A process for the continuous production of a particulate polymer, which comprises successfully processing, through the following steps (I) and (II), a polymer latex obtained by emulsion polymerization, step (I): the polymer latex is coagulated into a slurry in which particles thus coagulated are dispersed in water, step (II): the slurry obtained in step (I), an organic liquid whose solubility in water is 0.5 wt % or lower at 20° C. and incapable of dissolving the polymer and optionally water in an amount as needed are continuously mixed for granulation under the following conditions (a)-(c):

(a): the proportion of water in the whole mixture is 50–85 wt. %, (b): the amount of the organic liquid is 15 to less than 60 parts by weight per 100 parts by weight of the polymer in the polymer latex, (c): the temperature T (°C.) of the whole mixture is maintained for 0.5 minute to 1 hour on average within the range of the following equation $$A - 26 \leq T \leq A$$

wherein A means the azeotropic temperature (°C.) of the mixture.

2. The process as claimed in claim 1, wherein in step (II), a surfactant is added in an amount of 0.05–2 wt. % based on the organic liquid to control the interfacial tension between the dispersion medium of the slurry and the organic liquid within a range of 0.5–30 dyne/cm.

3. The process as claimed in claim 1 or 2 wherein step (I) is conducted under the following conditions (d) and (e):

(d): the coagulating temperature is lower by at least 10° C. than the glass transition temperature of the polymer in the polymer latex; and (e): based on the coagulated particles the proportion of particles having a particle size of 100 μm or greater is not greater than 1 wt. %, and the proportion of the polymer in the whole mixture is controlled with 10-25 wt. % in step (II).

4. The process as claimed in claim 3, wherein the organic liquid added is at least one of a paraffinic hydrocarbon, an alicyclic hydrocarbon or an alkyl-substituted derivative of said paraffinic or alicyclic hydrocarbon.

5. The process as claimed in claim 2, wherein the interfacial tension between the dispersion medium of the slurry and the organic liquid is controlled within a range of 0.5-20 dyne/cm.

6. The process as claimed in claim 2 or 5, wherein the interfacial tension between the dispersion medium of the slurry and the organic liquid is controlled by adding a surfactant in an amount of 0.5-2 wt. % based on the organic liquid.

7. The process as claimed in claim 2, wherein the surfactant is an anionic surfactant containing at least one sulfonic group in its molecule and/or polyvinyl alcohol.

8. The process as claimed in claim 2, wherein the anionic surfactant containing at least one sulfonic group in its molecule is added in an amount of 0.2-2 wt. %.

9. The process of claim 3 wherein the organic liquid is added in an amount of at least 20 parts by weight but not more than 55 parts by weight per 100 parts by weight of the polymer in the polymer latex.

* * * * *

UNITED STATES PATENT AND TRADEMARK OFFICE
CERTIFICATE OF CORRECTION

PATENT NO. : 5,064,938

DATED : November 12, 1991

INVENTOR(S) : Fumio Suzuki, et al.

It is certified that error appears in the above-identified patent and that said Letters Patent is hereby corrected as shown below:

On the Title page, item [30],

The second Foreign Application Priority Data are incorrect, should be,--Sep. 26, 1988 [JP]   Japan .....PCT JP88/00974--.

Signed and Sealed this

Twenty-fifth Day of May, 1993

Attest:

MICHAEL K. KIRK

Attesting Officer

Acting Commissioner of Patents and Trademarks